United States Patent
Jagtap et al.

(10) Patent No.: US 11,768,954 B2
(45) Date of Patent: Sep. 26, 2023

(54) SYSTEM, METHOD AND COMPUTER-ACCESSIBLE MEDIUM FOR CAPTURING DATA CHANGES

(71) Applicant: Capital One Services, LLC, McLean, VA (US)

(72) Inventors: Mayur Jagtap, Frisco, TX (US); Naga Venkata Sriram Vadakattu, Frisco, TX (US); Abhijit Chitnis, Frisco, TX (US); Janardhan Deepak Prabhakara, Allen, TX (US); Anurag Jain, Murphy, TX (US); Parvesh Kumar, Plano, TX (US); Rahul Surendra Nath, Frisco, TX (US); Behdad Forghani, Allen, TX (US); Mark Assousa, Plano, TX (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 370 days.

(21) Appl. No.: 16/902,535

(22) Filed: Jun. 16, 2020

(65) Prior Publication Data
US 2021/0390204 A1    Dec. 16, 2021

(51) Int. Cl.
*G06F 21/62* (2013.01)
*G06F 21/31* (2013.01)
(Continued)

(52) U.S. Cl.
CPC ...... *G06F 21/6245* (2013.01); *G06F 16/1734* (2019.01); *G06F 16/1865* (2019.01);
(Continued)

(58) Field of Classification Search
CPC .... G06F 21/62; G06F 21/552; G06F 21/6245; G06F 21/31
See application file for complete search history.

(56) References Cited

U.S. PATENT DOCUMENTS 7,249,356 B1 * 7/2007 Wilson .............. G05B 23/0264
                                                      700/87
7,418,457 B2    8/2008 Kaler et al.
(Continued)

OTHER PUBLICATIONS

Yuanwei Fang, Chen Zou, Aaron J. Elmore, and Andrew A. Chien. 2017. UDP: a programmable accelerator for extract-transform-load workloads and more. In Proceedings of the 50th Annual IEEE/ACM International Symposium on Microarchitecture (MICRO-50 '17). New York, NY, USA, 55-68 (Year: 2017).*

(Continued)

*Primary Examiner* — Kari L Schmidt
(74) *Attorney, Agent, or Firm* — HUNTON ANDREWS KURTH LLP

(57) ABSTRACT

The exemplary embodiments provide real-time data capture and processing which improves data processing performance and speed and facilitate passing of the processed data to various analytical sources, while maintaining superior data quality checks, particularly with respect to data elements associated with multiple data types. The proposed system and process can be used to continuously consume and listen to multiple events while mapping the events to appropriate schemas provided in a separate schema stream. The schema stream is provided once and cached to minimize bandwidth consumed by the transaction stream. The schema information is then further enriched with information from a metadata registry. The event data may then be compressed and aligned in memory tables based on the enriched schema. Once events are decoded and sorted into memory tables in accordance to the identified schema, each memory table can be processed in parallel.

18 Claims, 6 Drawing Sheets

(51) Int. Cl.
*G06F 16/17* (2019.01)
*G06F 16/22* (2019.01)
*G06F 16/18* (2019.01)
*G06F 16/21* (2019.01)

(52) U.S. Cl.
CPC ........ *G06F 16/211* (2019.01); *G06F 16/2282* (2019.01); *G06F 21/31* (2013.01)

(56) References Cited

U.S. PATENT DOCUMENTS

| | | | |
|---|---|---|---|
| 7,461,039 B1* | 12/2008 | Gilman | G06F 16/254 706/25 |
| 8,055,902 B2 | 11/2011 | Crichton et al. | |
| 8,095,726 B1 | 1/2012 | O'Connell et al. | |
| 8,281,151 B2 | 10/2012 | Shah et al. | |
| 8,458,487 B1* | 6/2013 | Palgon | H04L 9/40 713/193 |
| 8,713,073 B2* | 4/2014 | Johnston | G06F 16/219 707/673 |
| 9,311,378 B2* | 4/2016 | Subramanian | G06F 16/273 |
| 9,811,669 B1 | 11/2017 | Todd | |
| 9,922,036 B2 | 3/2018 | Nechaev | |
| 10,037,242 B2* | 7/2018 | Conrad | G06F 11/0793 |
| 10,592,494 B2* | 3/2020 | Diaconu | G06F 16/2365 |
| 10,877,961 B1* | 12/2020 | Richman | H04L 67/306 |
| 10,878,126 B1* | 12/2020 | Koduru | G06F 16/211 |
| 10,942,943 B2* | 3/2021 | Thomas | G06F 16/24568 |
| 11,537,737 B2* | 12/2022 | Koduru | G06F 16/254 |
| 2002/0049760 A1 | 4/2002 | Scott et al. | |
| 2003/0014335 A1* | 1/2003 | Lecheler-Moore | G06Q 40/12 705/30 |
| 2005/0234814 A1* | 10/2005 | Jones | G06Q 40/00 705/38 |
| 2006/0074621 A1* | 4/2006 | Rachman | G06Q 90/00 703/22 |
| 2007/0061359 A1 | 3/2007 | Kilday | |
| 2008/0040259 A1* | 2/2008 | Snow | G06Q 40/02 705/38 |
| 2008/0094247 A1* | 4/2008 | Milne | E21B 34/16 340/855.4 |
| 2009/0177757 A1 | 7/2009 | Pottenger | |
| 2010/0037056 A1 | 2/2010 | Follis et al. | |
| 2011/0119327 A1 | 5/2011 | Masuda | |
| 2011/0154015 A1 | 6/2011 | Rahman et al. | |
| 2011/0264767 A1 | 10/2011 | Liu et al. | |
| 2012/0054594 A1 | 3/2012 | Isaacson et al. | |
| 2012/0259948 A1 | 10/2012 | Drobychev et al. | |
| 2013/0212073 A1* | 8/2013 | Cochrane | G09B 7/02 707/687 |
| 2014/0007233 A1 | 1/2014 | Roesch | |
| 2014/0019498 A1 | 1/2014 | Cidon et al. | |
| 2014/0089273 A1 | 3/2014 | Borshack et al. | |
| 2014/0156866 A1 | 6/2014 | Kallstrom et al. | |
| 2014/0310241 A1 | 10/2014 | Goyen | |
| 2015/0019600 A1 | 1/2015 | Kanehira et al. | |
| 2015/0169623 A1 | 6/2015 | Wu et al. | |
| 2015/0254106 A1* | 9/2015 | Takase | G06F 9/4881 718/100 |
| 2015/0271267 A1 | 9/2015 | Solis et al. | |
| 2015/0277976 A1* | 10/2015 | De | G06F 9/4843 718/101 |
| 2015/0295766 A1* | 10/2015 | Dickey | H04L 41/0816 709/221 |
| 2015/0295775 A1* | 10/2015 | Dickey | H04L 41/0806 715/735 |
| 2015/0295780 A1* | 10/2015 | Hsiao | H04L 41/22 715/736 |
| 2015/0341212 A1* | 11/2015 | Hsiao | H04L 67/75 715/735 |
| 2017/0154092 A1 | 6/2017 | Reimer et al. | |
| 2017/0262495 A1* | 9/2017 | Peloski | G06F 16/2246 |
| 2017/0286456 A1* | 10/2017 | Wenzel | G16H 10/20 |
| 2017/0344602 A1 | 11/2017 | Hada | |
| 2018/0074870 A1* | 3/2018 | Park | G06F 16/9024 |
| 2018/0157699 A1* | 6/2018 | Sharma | G06F 16/211 |
| 2018/0247076 A1* | 8/2018 | Lerner | G06F 16/9574 |
| 2019/0042539 A1* | 2/2019 | Kalsi | G06F 7/5443 |
| 2019/0095510 A1* | 3/2019 | Cruise | G06F 16/24568 |
| 2019/0102415 A1* | 4/2019 | Bishnoi | G06F 16/244 |
| 2019/0197030 A1* | 6/2019 | Li | G06F 16/2322 |
| 2019/0207754 A1* | 7/2019 | Iyer | H04L 9/0877 |
| 2020/0026710 A1* | 1/2020 | Przada | G06F 16/254 |
| 2020/0210478 A1* | 7/2020 | Wada | G06F 16/211 |
| 2021/0049153 A1* | 2/2021 | Forghani | G06F 16/27 |
| 2021/0200741 A1* | 7/2021 | Frenkel | G06F 16/2358 |
| 2022/0147009 A1* | 5/2022 | Cooley | G06F 21/6218 |

OTHER PUBLICATIONS

H. Isah, T. Abughofa, S. Mahfuz, D. Ajerla, F. Zulkernine and S. Khan, "A Survey of Distributed Data Stream Processing Frameworks," in IEEE Access, vol. 7, pp. 154300-154316, 2019. (Year: 2019).*

Dennis Butterstein, Daniel Martin, Knut Stolze, Felix Beier, Jia Zhong, and Lingyun Wang. 2020. Replication at the speed of change : a fast, scalable replication solution for near real-time HTAP processing. Proc. VLDB Endow. 13, 12 (Aug. 2020), 3245-3257. (Year: 2020).*

Oh, Se Won, et al. "Study on the multi-modal data preprocessing for knowledge-converged super brain." 2016 International Conference on Information and Communication Technology Convergence (ICTC). IEEE, 2016, pp. 1088-1093. (Year: 2016).*

* cited by examiner

SYSTEM, METHOD AND COMPUTER-ACCESSIBLE MEDIUM FOR CAPTURING DATA CHANGES

FIELD OF THE DISCLOSURE

The present disclosure relates generally to streaming data, and more specifically, to exemplary embodiments of an exemplary system, method, and computer-accessible medium for capturing data changes.

BACKGROUND INFORMATION

Batch Processing or Batch Jobs generally refers to jobs that can run without end user interaction, or can be scheduled to run as resources permit. Batch processing can be used for frequently used programs that can be executed with minimal human interaction. Batch applications are beneficial in most organizations in large part because many common business processes are amenable to batch processing. While online systems can also function when manual intervention is not desired, they are not typically optimized to perform high-volume, repetitive tasks. Therefore, even new systems usually contain one or more batch applications for updating information at the end of the day, generating reports, printing documents, and other non-interactive tasks that must complete reliably within certain business deadlines.

Some applications are amenable to flow processing, namely those that only need data from a single input at once and can start the next step for each input as it completes the previous step. In this case, batch processing lowers latency for individual inputs, allowing them to be completed without waiting for the entire batch to finish. However, many applications require data from all records, notably computations such as totals. In this case, the entire batch must be completed before one has a usable result: partial results are not usable.

Modern batch applications make use of modern batch frameworks such as Jem The Bee, Spring Batch or implementations of JSR 352 written for Java, and other frameworks for other programming languages, to provide the fault tolerance and scalability required for high-volume processing. In order to ensure high-speed processing, batch applications are often integrated with grid computing solutions to partition a batch job over a large number of processors, although there are significant programming challenges in doing so. High volume batch processing places particularly heavy demands on system and application architectures as well. Architectures that feature strong input/output performance and vertical scalability, including modern mainframe computers, tend to provide better batch performance than alternatives.

In many large organizations, data can be captured in a batch format, and in batches that run at night, or some other particular period of time during the day. However, it can be beneficial to process data, in real-time, such that any time the transaction happens, the data is processed and passed to an analytical source. This process can be difficult, and can suffer from data quality issues. Additionally, it can be difficult to process, in real-time, different data types.

Thus, it may be beneficial to provide an exemplary system, method, and computer-accessible medium for capturing data changes, which can overcome at least some of the deficiencies, described herein above.

SUMMARY OF EXEMPLARY EMBODIMENTS

An exemplary system, method and computer-accessible medium for batch processing of a plurality of events can include receiving first information related to the events, determining a schema(s) for each of the events, determining a data quality for each of the events, generating second information by decomposing each of the events based on the schema(s), and storing the second information in a database(s). The schema (s) can be determined by determining a fingerprint(s) for each of the events, sending the fingerprint(s) to a fingerprint module, and receiving the schema(s) from the fingerprint module. Each of the events can be decomposed into multiple source tables, where each of the source tables can include insert events, update events, and delete events. Each of the events can be decoded by grouping each of the events by a table.

In some exemplary embodiments of the present disclosure, the data quality can be determined using a data quality module. Each of the events can be tokenized by, for example, scanning each of the events for untokenized information that needs to be tokenized, and tokenizing the untokenized information based on a tokenization module. The untokenized information can include sensitive information regarding a person(s). The second information can be compressed prior to storing it in the database(s). The database(s) can include at least two databases where the second information can be stored in a first database of the at least two databases, and the first database can be mirrored in a second database of the at least two databases. The events can be split into a first set of events and a second set of events, the first set of events can be batch processed using a first processor, and the second set of events can be batch processed using a second processor. The events can be related to a loan application for a person. The loan application can be for an automobile loan.

Additionally, an exemplary system, method and computer-accessible medium for batch processing of a plurality of transactions can include receiving first information related to the transactions, decomposing each of the transactions into a plurality of discrete events, determine a fingerprint(s) for each of the discrete events, determining a schema(s) for each of the discrete events based on the fingerprint(s), grouping and coding the discrete events based on the schema(s), and storing the grouped and coded discrete events in a database. Each of the transactions can be decomposed into multiple sources tables, and each of the source tables can include multiple insert events, update events, and delete events. The schema(s) can be determined by sending the fingerprint(s) to a fingerprint module, and receiving the schema(s) from the fingerprint module. Each of the transactions can be tokenized. The transactions can be compressed prior to storing them in the database. The transactions can be compressed in a linear format.

Further, an exemplary system, method and computer-accessible medium for batch processing of a plurality of events can include receiving information related to the events, determining a fingerprint(s) for each of the events, determining a data quality for each of the events, decomposing each of the events based on the fingerprint(s), tokenizing each of the events, and storing each of the events in a database(s).

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which.

DETAILED DESCRIPTION OF EXEMPLARY EMBODIMENTS

Figure 1:
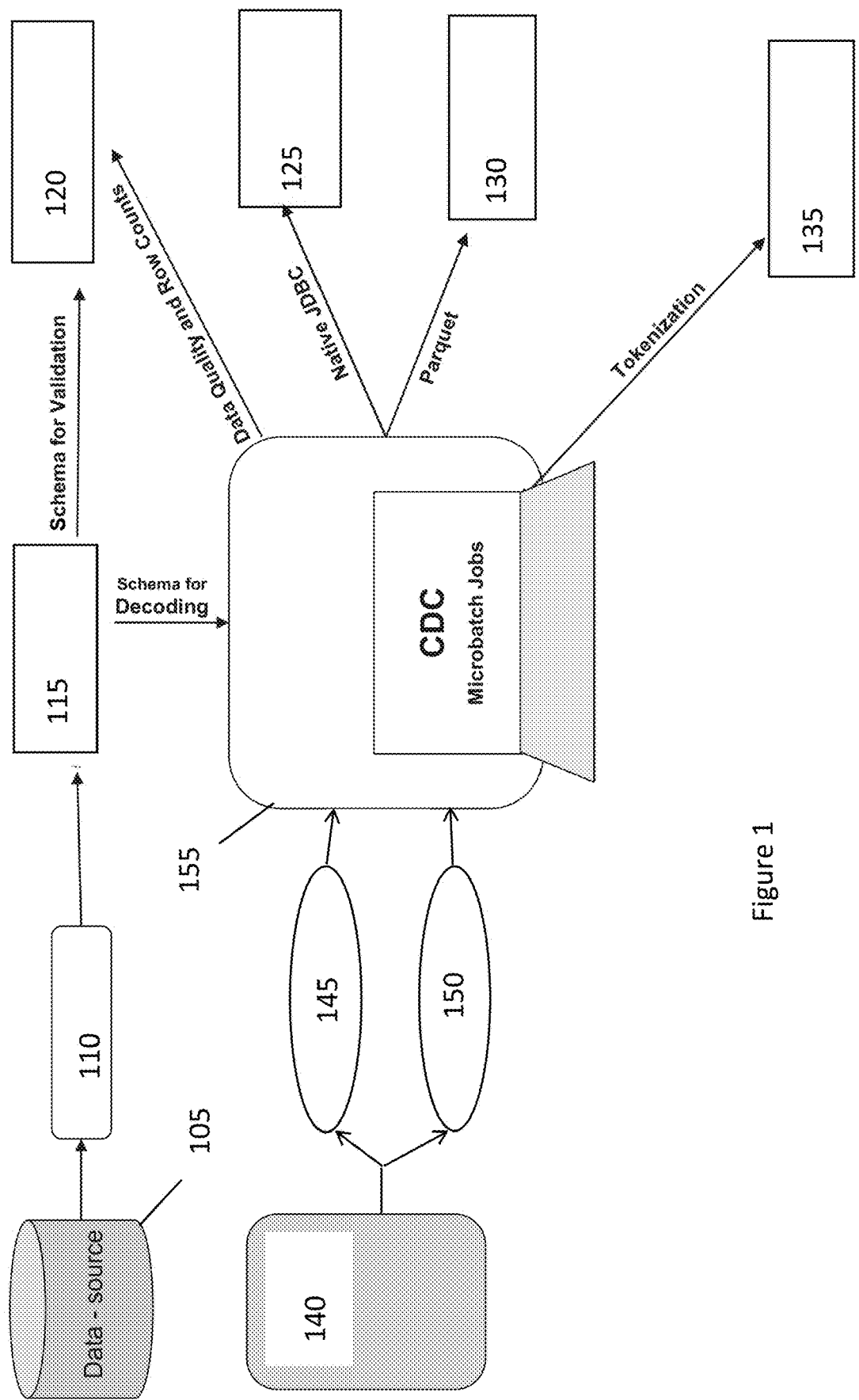
FIG. 1 is an exemplary flow/schematic diagram illustrating batch processing according to an exemplary embodiment of the present disclosure.

The exemplary system, method, and computer-accessible medium, according to an exemplary embodiment of the present disclosure, can be utilized for any financial transaction (e.g., credit card transactions, auto loan transactions, home loan transactions, etc.). The exemplary system, method, and computer-accessible medium, according to an exemplary embodiment of the present disclosure, can provide real-time data capture and processing, which can also facilitate passing of the processed data to various analytical sources. Additionally, superior data quality checks can be facilitated, which can include ensuring that the data quality is not compromised, especially in cases where the data has multiple data types like the integer flow. Rich metadata support can be incorporated, as well as tokenization. Thus, for example, where there is a lot of customer sensitive information being received, the exemplary system, method and computer-accessible medium can ensure that there are no sensitive data fields using, for example, tokenization, which can facilitate sharing of sensitive data.

The exemplary system, method, and computer-accessible medium, according to an exemplary embodiment of the present disclosure, can be used to continuously consume and listen to multiple events and ensure that no events are lost, and that the order of events is maintained. Additionally, data can be mapped to the events using a schema. For example, a table (e.g., a customer payments table) can be utilized, and the data in the table can be published for payments information, then the exemplary system, method and computer-accessible medium can map the payments information with a particular schema. This data can be processed in a parallel format (e.g., using a suitable parallel processing procedure) and in a distributed environment. After this has been performed, the data can be aligned in a data frame (e.g., one or more memory tables). After the data is extracted, the data can be stored (e.g., compressed and then stored). Various suitable storage procedures can be used (e.g., snowflake), and the information can be incorporated into any suitable analytical dashboard, any analytical database. Thus, the exemplary system, method, and computer-accessible medium can be used to (i) consume data, (ii) process the data, and (iii) then store that data.

Exemplary Schema(s)

Transactions are composed of events. Event data can be organized into columns, rows, and tables. The exemplary schemas can refer to machine readable table formatting and meta-data information facilitating efficient event decoding and interpretation. A schema can define a canonical target table name, column names, and disambiguating type information for a given table. Event data can be conveyed in an Avro format, which may only convey numeric, Boolean, and text data. Avro is a row-oriented remote procedure call and data serialization framework. It uses JSON for defining data types and protocols, and serializes data in a compact binary format. Additional data can be represented, but the result can be ambiguous (e.g., date information must be represented as text, numeric data conveys no notion of numeric precision). Type information within the schema can facilitate a richer and more precise type set (e.g., timestamp, floating point values, currency, etc.) which can be used by exemplary decoder logic to convert the Avro representations of data back into their original type. Schemas can be tagged with a unique hash value, and can be transmitted in a separate stream from the Transaction Stream exactly once. Events within transactions can be tagged with the hash value corresponding to the applicable schema. This configuration can minimize bandwidth consumed by the transaction stream as schema information can already be cached by the decoding system and need not be included in the Transaction Stream data.

Exemplary Parallel Processing

Once transactions are broken up into discrete events, the events can be sorted by their schema hash, which can be synonymous with the destination table to which the event belongs. Event order must be preserved within a given table. However, events between tables can be stochastically independent. This degree of freedom allows tables to be processed in parallel. Transactions comprising a micro-batch can be accumulated and decomposed into events serially. Once the events are sorted into tables using a schema hash as a key, each table can be processed in parallel, making more efficient use of computing resources. Further, once transaction events have been compressed, each event can be idempotent (e.g., order is irrelevant) within the micro-batch. This allows individual compressed events to be written in an arbitrary order, enabling further parallel processing.

Exemplary Data Compression

Transaction data can be composed of events, which can be different from rows. Events can contain an indicator of the event type (e.g., row Insert, Update, or Delete) as well as a snapshot of the resulting data row after the event took place, or merely those data elements (e.g., columns) which changed as a result of the event. Because the schema information contains primary key data, the exemplary system, method, and computer-accessible medium can determine if multiple events occurred on the same target row. When multiple events occur to the same row, these events can be consolidated into a single event with the same net effect on the row, thus compressing multiple events into a single event, enabling greater parallel processing and minimizing load on the final storage medium.

The exemplary schema used can be on the table level. For example, if there are multiple tables (e.g., customer account table, payments information table, etc.), each table can have its own table structure, which can include different columns, and every column can have multiple data types. The table structure can be defined explicitly in the schema. Column name, order, and type are all expressly delineated in the schema, providing an unambiguous definition of the table structure. The exemplary system, method, and computer-accessible medium, according to an exemplary embodiment of the present disclosure, can extract schema for each table, and then extract events based on the event schema. Schema information for each table can be stored in a database. Thus, when processing data for a particular table, the database can be accessed to retrieve the specific schema information for that database (e.g., the row and columns for each table). Each row and/or column can have its own data type, and can include various different types of metadata (e.g., what each column includes or stands for). Then, a particular row can be accessed and analyzed using the information about the rows and columns in the table. When a message is received that relates to a particular table, this message can be consumed (e.g., analyzed) by mapping the message to the columns in the table. If the mapping is successful, then the data is processed. If the mapping is unsuccessful (e.g., if there is a mismatch), then monitoring actives can temporarily halt to determine the cause of the mismatch (e.g., non-updated schema, or wrong schema accessed). After the schema mismatches are addressed, and a match now occurs, this information can be processed, and then stored.

An exemplary procedure can be used to calculate a hash value from an avro schema. This procedure can create a unique hash value (e.g., a fingerprint) for a given described schema. As soon as a column is added, removed, or altered in any way within a schema, the resulting fingerprint changes. Whenever a table is added or modified in the source system, its new schema is transmitted in the Schema Channel. The exemplary system, method, and computer-accessible medium can receive the new schema, calculate its fingerprint, and store the schema in a cache indexed by the fingerprint. Event data can be transmitted with the fingerprint attached. For each event, the fingerprint can be used to retrieve the associated table schema. The event data can be compared against the retrieved schema, decoded using the schema, and rejected if the schema does not exist for the event does not match. Events with the same fingerprint can belong to the same table and can be grouped together.

The exemplary system, method, and computer-accessible medium, according to an exemplary embodiment of the present disclosure, can utilize one or more aperture technologies for processing (e.g., Spark). The aperture technologies utilized can be focused on streaming data applications. This can facilitate the distribution of data in a multiple load cluster enrollment, which can be scalable for large amounts of data/information. For example, where the exemplary system, method, and computer-accessible medium can be used to capture large amounts of data, the aperture technology can facilitate the distribution of the increased amount of data. The exemplary system, method, and computer-accessible medium, according to an exemplary embodiment of the present disclosure, can facilitate the use of parallelism and atomic operations with the exemplary aperture technology. For example, a batch of data can be received for a particular table, which can be tied to sensitive information or rich content with sensitive data, which can be tokenized. Before the batch data is ordered and distributed, one or more atomic operations can be performed on the data. Atomic operations can include (i) Insert—an event that causes a new row to be created in the target data store, (ii) Update—an event that causes an existing row in the target store to be altered, and (iii) Delete—an event that causes an existing row in the target store to be removed. The data can be tokenized and then forwarded for parallel enrollment. In particular, a custom procedure can be used to perform certain operations on the data, including saving the data. Additionally, the exemplary system, method, and computer-accessible medium, according to an exemplary embodiment of the present disclosure, can ensure that no transactions are missed.

Exemplary Custom Procedure

A custom procedure is transformation that can be performed on the data "in flight" as it traverses the system. In particular, a custom procedure can be performed after transactions have been decomposed into discrete events and the events have been compressed, but before the events are written out to the target data store. The exemplary system, method, and computer-accessible medium can provide a point where any custom procedure can be "plugged in" at this point in processing. The exemplary custom procedure can be a tokenization procedure. In this process, all events containing recognizable social security numbers are pulled into a separate group. Unique social security numbers are extracted and sent to a tokenization authority, which can exchange them for tokens. The tokens are then substituted back into the collected events, replacing the social security numbers. The tokenized events are then recombined with the remaining events and processing resumes. Other suitable tokenizations can be implemented including, but limited to, sensitive information, account numbers, biographical information, or any other identifiable information.

The exemplary system, method, and computer-accessible medium, according to an exemplary embodiment of the present disclosure, can store the data in any suitable file format. For example, the data can be stored in clusters and in a linear order. Additionally, the data can be compressed prior to being stored, or during the storage procedure.

When large amounts of data are processed (e.g., a large number of transactions) over a short period of time (e.g., milliseconds or nanoseconds), traditional processing systems can miss, or incorrectly process, much of the data. However, missing even a single transaction can have a significant effect on the later-processed data. Thus, the exemplary system, method, and computer-accessible medium, according to an exemplary embodiment of the present disclosure, can ensure that all transactions are processed. For example, whenever an event is received and processed, an operation is performed before the data is submitted to an analytical database, or even before it is stored in a file system. The exemplary procedure can then commit transaction when there are no errors, when there is no an application crash, or there are no problems for that event to be stored at the end system. Thus, the exemplary system, method and computer-accessible medium can ensure that the data was sent to be stored, and then a confirmation is received that the data was stored (e.g., that an acknowledgment that the data was stored is received).

The exemplary system, method, and computer-accessible medium, according to an exemplary embodiment of the present disclosure, will not "roll forward" or commit the contents of a micro-batch until all events have been written to their target destinations. Regardless of the volume of events, the number of target data stores, or the number of steps involved in processing the data, disassembling transactions, validating events, decoding events, compressing events, writing them to each target data store, the data read from the source is not considered processed until all operations are complete. If at any point the process is interrupted for any reason, the last micro-batch will be reprocessed from the beginning without compromising data integrity.

After a transaction is committed, this can be considered as a read product event. If an error is received during this operation, the message can be held to be examined at a later time, and the message will not be committed. In the event of a crash of the processing application, messages can be on a hold status. The processing application can be restarted, and the hold status can be removed to facilitate processing of the transactions. If an error is received during processing, the transaction can be reprocessed (e.g., reprocessed one or more times) until the no error is received. After a predetermined number of failures, the event is held for later analysis or processing.

The exemplary system, method, and computer-accessible medium, according to an exemplary embodiment of the present disclosure, can utilize a replication procedure, which can create a hot spare. For example, a database running events and other operations can be used. A link from this database can be created with another database that can be used to replicate data from the first database to the second database. The database can be the same type of database (e.g., same architecture, same layout, same schema, etc.).

While the same database type can be employed, in some exemplary embodiments of the present disclosure, different database types can be used. For example, the data can be analyzed to determine the different atomic events associated with each database entry. This information can be propagated through an event logging processor of a change data capture process (e.g., through various pipelines) until a buffering condition is achieved in the state such that there are a series of events that occur. These events can be stacked up in an ordered list and processed in that order. Next, a point that is a reasonable coherent spot where a marker can be set can be determined. At this point, a time stamp can be placed to be compared with the first database. Then, the events can be recorded in the new architecture. If at any point any of the instances fail, the last set of events that came through that did not record properly can be ignored, and a retry or restart procedure can be utilized.

Exemplary Event Logging Procedure

The exemplary event logging processor of a change data capture process facilitates event logs generated by the source database to be transmitted into a buffered messaging service, which can be specific to each company or corporation. Commercial databases typically supply a logging mechanism that allows a database to be restored to a known state by recovering, from a point in time, a backup, and playing back the log on top of this. Alternatively, the log can be played back onto another identical target database, enabling a replication mechanism. The exemplary an event logging processor a change data capture procedure can utilize this logging mechanism and render logged events into messages that can be directed to devices other than an identical database from the same vendor, in this case a messaging service. The messages can include one or more ordered transactions, which can be composed of one or more ordered atomic events. The messaging service can provide buffering and storage until the exemplary system, method, and computer-accessible medium is ready to process the messages.

Moving from one type of database to another type of database can utilize data that has a symbolic representation. For example, in transactions associated with a particular person, there can be a person's name, which can be a string. There can also be an amount or balance that can be a floating point, integer, or decimal. Various flags can be used where the data can logically have the same notion. The logical representation can be examined and translated to the new medium (e.g., new database type). In the new database, the logical representation, which has been translated to the new medium, can then be translated into the specific structure of the new database. This can facilitate the transfer of different information types from one database type to another.

The exemplary system, method, and computer-accessible medium, according to an exemplary embodiment of the present disclosure, can use various suitable tools to ensure that the count from the source system and the count on the target system, after the position of the data, matches. This can include ensuring that there is no data leakage occurring, which can include matching the number of entries from one database to the number of entries in the other database.

FIG. 1 is an exemplary flow/schematic diagram illustrating batch processing according to an exemplary embodiment of the present disclosure. For example, as shown in FIG. 1, Database 105 can be used to provide data for processing.

Metadata Scanner 110 can be used to provide enhanced schema information about tables and columns in the Data Source 105. Metadata Scanner 110 can store this information in a Metadata Registry 115. Metadata Scanner 110 can connect the Data Source 105 via a standard Java Database Connectivity ("JDBC") mechanism, and can interoperate with any data source that supports JDBC. Metadata Scanner 110 can connect to Metadata Registry 115 using Representational State Transfer ("REST") Application Programming Interface ("API"). Using a set of predefined template queries, Metadata Scanner 110 can iterate over all tables in the Data Source 105. Metadata Scanner 110 can extract metadata for all relevant objects. This can include, but is not limited to, all tables and columns of interest, their names, type information, relevance as a primary key, nullability, and human readable descriptions. The metadata can be used to populate corresponding registrations in Metadata Registry 115. These registrations can describe the tables in Data Source 105. The datasets can then be transformed and augmented with additional data to create equivalent metadata registrations for the target data stores (e.g., Database 125 and Target Object Store 130. The metadata extraction procedure is non-destructive, and can be triggered as needed to capture schema changes made in Data Source 105 over time to update existing registrations in the schema registry, or to create new registrations as needed. The exemplary system, method and computer-accessible medium (e.g., as shown by CDC 155), can then use these metadata registrations to augment schema data received in Schema Stream 145, and to decode the events received in the Transaction Stream 150. The metadata registrations in Metadata Registry 115 describing the target data stores can be used to guide its writing of data to those stores. Further, Data Quality Validation Tool 120 can use these same registrations to test the integrity and validity of data written by the exemplary system, method, and computer-accessible medium.

As shown in FIG. 1, Metadata Registry 115 can be used, which can contain a superset of schema information provided by the Schema Stream including Primary Key information and human readable descriptions of tables and columns. The exemplary system, method, and computer-accessible medium can use this registry to enhance and validate schemas received via the Schema Stream (e.g., a Schema for Decoding). Data Quality Validation Tool 120 can be used to validate ingested data quality against the schema definitions in Metadata Registry 115 (e.g., a Schema for Validation) and reported row counts (e.g., is the data in the form expected and is the number of rows generated correct?) and logs all of the information. The exemplary system, method and computer-accessible medium (e.g., shown as element 155) does not need to rely on the validation tool to perform these tests, performing them itself, but can use the Validation tool logs to report results (e.g., Data Quality and Row Counts).

Adapter Tool 140 can be used to convert transaction logs created by Database 105 into transmittable messages carried by the Buffering Message Store, which includes Schema Stream 145 and Transaction Stream 150. Target Database 125 can be used to house processed events in database tables. Database 125 can be any suitable database that conforms to the Java Database Connection paradigm. Target Object Store 130 can be used to house processed events in parquet formatted files. This can be any suitable file or object store. External Interface 135 can be used to interact with it while data is in flight.

Data from the Schema Stream 145 may not be sufficient to decode data in all cases. Avro schema can provide for limited data types (e.g., those that can be represented in Javascript Object Notation ("JSON"). Many data sources have a much more extensive type set. Unsupported types (e.g., date-time) can be conveyed as strings. To further disambiguate these unsupported types, and to reproduce data elements representing these types on Database 125 and Target Object Store 130, the exemplary system, method and computer-accessible medium 155 can consult Metadata Registry 115, which can store enhanced type information as well as other useful metadata elements. This enhanced schema definition can improve decoding of data received in Transaction Stream 150, and can act as a "source of truth," facilitating validation of received data, and ensuring that it conforms to the stored schema (e.g., a data element expected to be a date-time does not contain "John Doe" which is a perfectly valid string).

Figure 2:
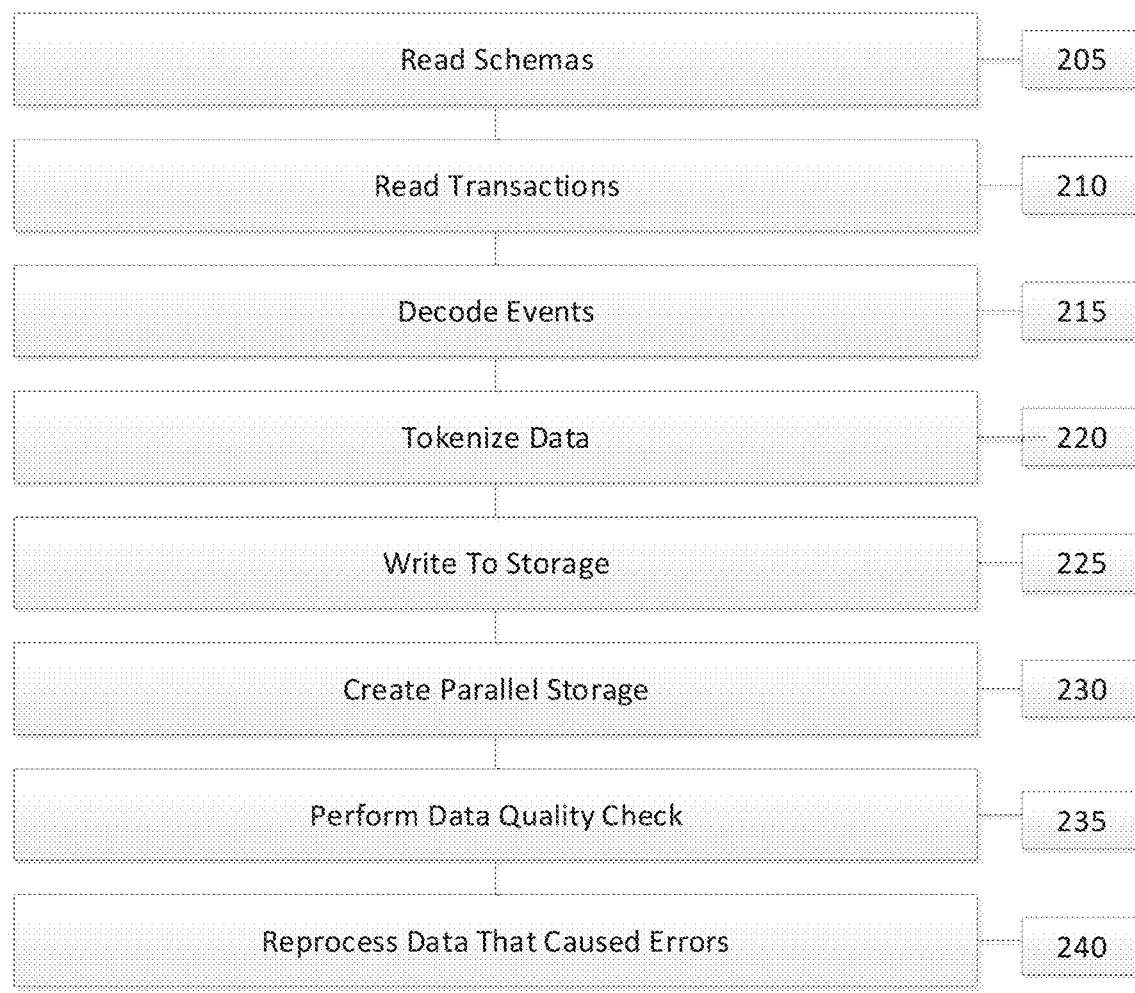
FIG. 2 is an exemplary flow diagram illustrating batch processing according to an exemplary embodiment of the present disclosure.

FIG. 2 is an exemplary flow diagram illustrating batch processing according to an exemplary embodiment of the present disclosure. For example, at procedure 205, schemas can be read. This can include determining or obtaining the schema for a table used to store that data. For each piece of data that is received (e.g., each event), a fingerprint can be determined. Fingerprinting can include mapping large data items to shorter bit strings, where the data's fingerprint can uniquely identify the original data. This fingerprint can be used for data deduplication purposes. Schemas can be determined and/or received (e.g., based on the fingerprints) from Metadata Scanner 110.

At procedure 210, transactions can be read. Transactions can be decomposed into discrete events and/or into multiple source tables. The tables can depend on the data being decomposed (e.g., a table can be selected based on the type of data). In some exemplary embodiments of the present disclosure, an indicator can be provided with the data, which can indicate the type of data being decomposed, which can facilitate the exemplary system, method, and computer-accessible medium to match the data with the particular source table. Alternatively, the exemplary system, method, and computer-accessible medium can perform a data check on the data to determine the source table. Multiple insert/update/delete events can occur for each table.

At procedure 215, events can be decoded. Each event can be validated (e.g., using Data Quality Validation Tool 120). Avro Data can be coded into one or more readable fields. Transactions can be decomposed into discrete events, and the events can then be grouped by fingerprint and/or table. At procedure 220, the data can be tokenized. All tables that can require tokenized data can be scanned for untokenized data. This can be based on the type of data (e.g., financial account information, social security numbers, addresses, or any other sensitive information). Specific tables can be selected for scanning based on the type of information (e.g., the sensitivity of the data) being stored in the table. Multiple tokenization requests for micro batches of data can be merged into a single call. Untokenized data can then be replaced with tokenized data using any suitable tokenization procedure.

At procedure 225, the data can be written to storage. A transaction can be created in all table where the transaction can be stored. All writes for the transaction can be completed before the transaction is committed. At procedure 230, the data can be stored in a parallel storage arrangement. At procedure 235, a data quality check can be performed on the data. This can include providing the schema and/or row count information (e.g., row count values) for downstream validation. At procedure 240, any data that caused errors can be reprocessed (e.g., immediately, or at a later point in time).

Figure 3:
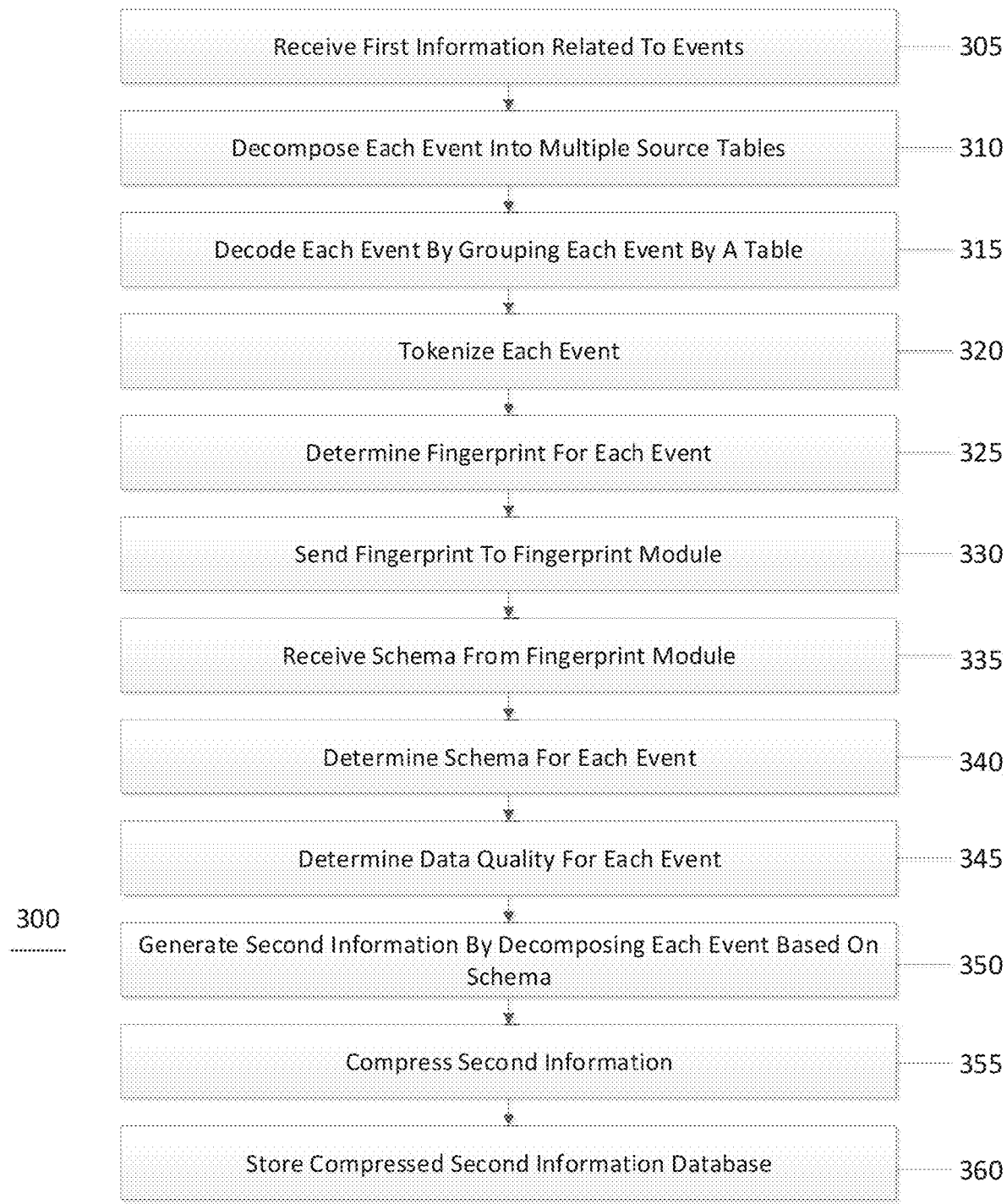
FIG. 3 is a flow diagram of a method for batch processing a plurality of events according to an exemplary embodiment of the present disclosure.

FIG. 3 is a flow diagram of a method 300 for batch processing a plurality of events according to an exemplary embodiment of the present disclosure. For example, at procedure 305, first information related to the events can be received. At procedure 310, each of the events can be decomposed into multiple source tables. At procedure 315, each of the events can be decoded by grouping each of the events by a table. At procedure 320, each of the events can be tokenized. At procedure 325, a fingerprint for each of the events can be determined. At procedure 330, the fingerprint can be sent to a fingerprint module. At procedure 335, the schema can be received from the fingerprint module. Alternatively, rather than using fingerprints and receiving a schema, the schema can be determined for each of the events using another suitable procedure at procedure 340. At procedure 345, a data quality for each of the events can be determined. At procedure 350, second information can be generated by decomposing each of the events based on the schema. At procedure 355, the second information can be compressed. At procedure 360, the compressed second information can be stored in a database.

Figure 4:
FIG. 4 is a flow diagram of a method for batch processing a plurality of transactions according to an exemplary embodiment of the present disclosure.

FIG. 4 is a flow diagram of a method 400 for batch processing a plurality of transactions according to an exemplary embodiment of the present disclosure. For example at procedure 405, first information related to the transactions can be received. At procedure 410, each of the transactions can be tokenized. At procedure 415, the transactions can be decomposed into a plurality of discrete events. At procedure 420, one or more fingerprints can be determined for each of the discrete events. At procedure 425, one or more schema can be determined for the discrete events based on the one or more fingerprints. At procedure 430, the transactions can be decomposed into multiple source tables. At procedure 435, the discrete events can be grouped and decoded based on the one or more schemas. At procedure 440, the transactions can be compressed. At procedure 445, the grouped, coded, and compressed transactions can be stored in a database.

Figure 5:
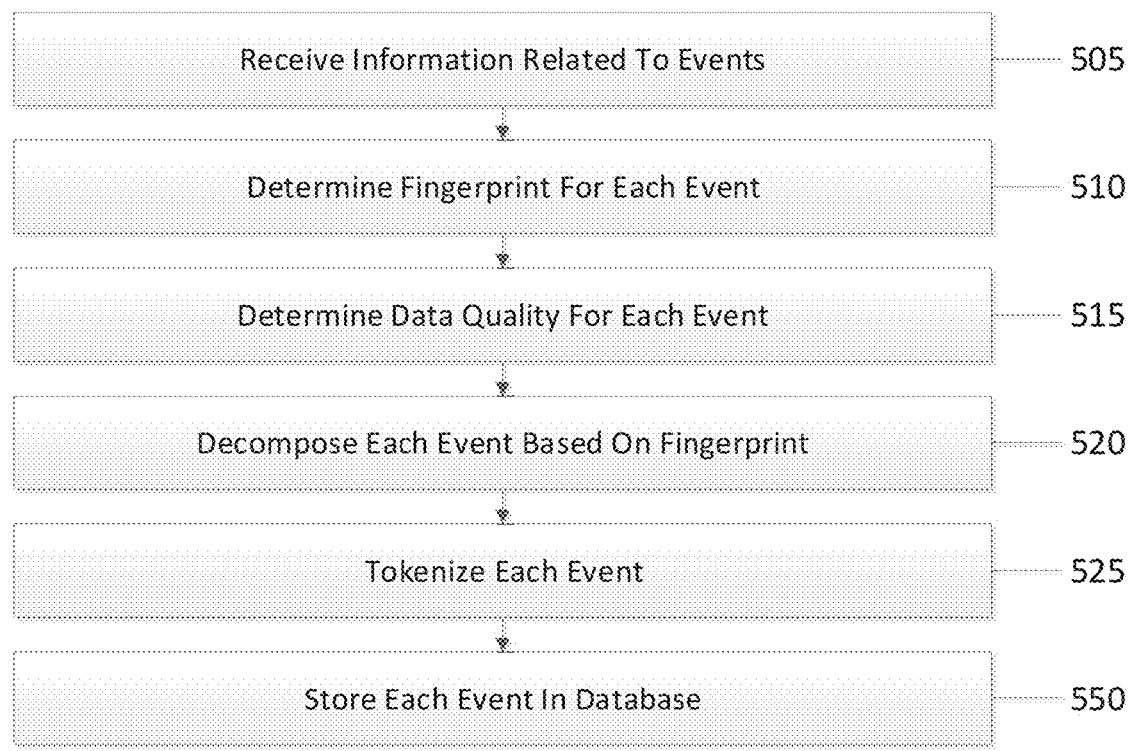
FIG. 5 is a flow diagram of a further method for batch processing a plurality of events according to an exemplary embodiment of the present disclosure.

FIG. 5 is a flow diagram of a further method 500 for batch processing a plurality of events according to an exemplary embodiment of the present disclosure. For example, at procedure 505, information related to the events can be received. At procedure 510, a fingerprint for each of the events can be determined. At procedure 515, a data quality for each of the events can be determined. At procedure 520, each of the events can be decomposed based on the fingerprint. At procedure 525, each of the events can be tokenized. At procedure 530, each of the events can be stored in database.

Figure 6:
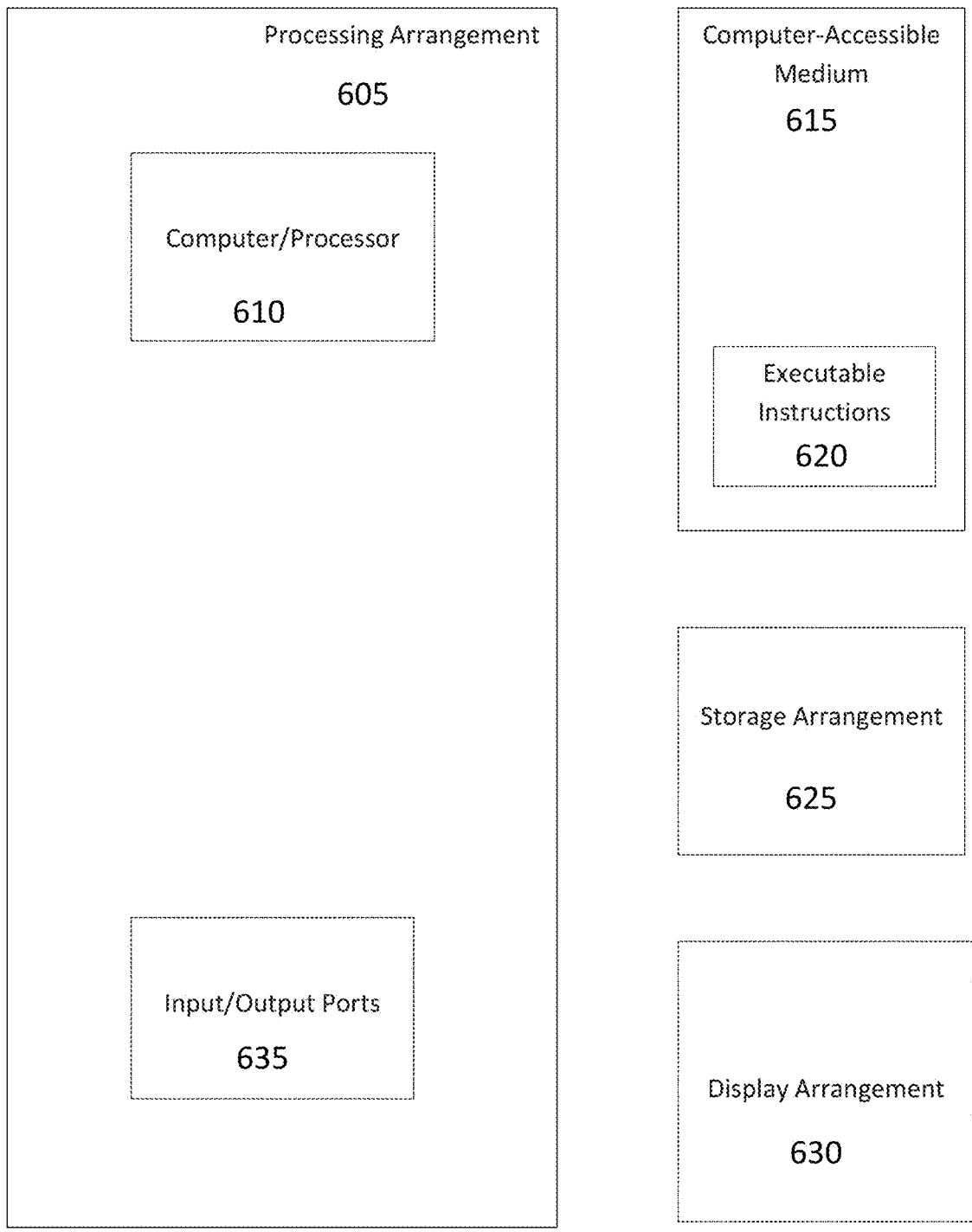
FIG. 6 is an illustration of an exemplary block diagram of an exemplary system in accordance with certain exemplary embodiments of the present disclosure.

FIG. 6 shows a block diagram of an exemplary embodiment of a system according to the present disclosure. For example, exemplary procedures in accordance with the present disclosure described herein can be performed by a processing arrangement and/or a computing arrangement (e.g., computer hardware arrangement) 605. Such processing/computing arrangement 605 can be, for example entirely or a part of, or include, but not limited to, a computer/processor 610 that can include, for example one or more microprocessors, and use instructions stored on a computer-accessible medium (e.g., RAM, ROM, hard drive, or other storage device).

As shown in FIG. 6, for example a computer-accessible medium 615 (e.g., as described herein above, a storage device such as a hard disk, floppy disk, memory stick, CD-ROM, RAM, ROM, etc., or a collection thereof) can be provided (e.g., in communication with the processing arrangement 605). The computer-accessible medium 615 can contain executable instructions 620 thereon. In addition or alternatively, a storage arrangement 625 can be provided separately from the computer-accessible medium 615, which can provide the instructions to the processing arrangement 605 to configure the processing arrangement to execute certain exemplary procedures, processes, and methods, as described herein above, for example.

Further, the exemplary processing arrangement 605 can be provided with or include an input/output ports 635, which can include, for example a wired network, a wireless network, the internet, an intranet, a data collection probe, a sensor, etc. As shown in FIG. 6, the exemplary processing arrangement 605 can be in communication with an exemplary display arrangement 630, which, according to certain exemplary embodiments of the present disclosure, can be a touch-screen configured for inputting information to the processing arrangement in addition to outputting information from the processing arrangement, for example. Further, the exemplary display arrangement 630 and/or a storage arrangement 625 can be used to display and/or store data in a user-accessible format and/or user-readable format.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. A non-transitory computer-accessible medium having stored thereon computer-executable instructions for optimal batch processing of transaction streams in real-time, wherein, when a computer arrangement executes the instructions, the computer arrangement is configured to perform procedures comprising:
    decomposing each transaction in a transaction stream into one or more discrete events, wherein the transaction stream is decomposed into a plurality discrete events;
    determining a fingerprint for each of the plurality of discrete events, by mapping one or more event data items into shorter bit string that uniquely identifies a corresponding event data item;
    receiving a plurality of schemas in a scheme stream transmitted via a distinct schema channel, wherein the plurality of schemas are transmitted once and stored in a cache memory;
    determining at least one schema for each of the plurality of discrete events based on a corresponding fingerprint, wherein a change in one or more data values associated with a discrete event results in a new schema;
    compressing, two or more discrete events, corresponding to a common row, into a single discrete event, the common row being identified based on the at least one schema, wherein the at least one schema is enhanced with one or more supplemental metadata provided by a metadata registry;
    storing the plurality of discrete events across a parallel arrangement of one or more source tables, based on a schema hash value associated with the at least one schema;
    scanning, in parallel, one or more source tables for one or more untokenized data elements corresponding to a sensitive information record, wherein each of the one or more source tables is associated with a distinct schema hash value one or more discrete events; and
    tokenizing the one or more untokenized data in parallel across the one or more source tables; and
    writing back the one or more tokenized data to one or more corresponding source tables in parallel.

2. The computer-accessible medium of claim 1, wherein the computer arrangement is configured to determine the at least one schema by:
    sending the fingerprint to a fingerprint module; and
    receiving the at least one schema from the fingerprint module.

3. The computer-accessible medium of claim 1, wherein each of the one or more source tables includes insert events, update events, and delete events.

4. The computer-accessible medium of claim 1, wherein the computer arrangement is configured to determine the data quality using a data quality module.

5. The computer-accessible medium of claim 1, wherein the computer arrangement is configured to tokenize each of the events by:
    using a tokenization module.

6. The computer-accessible medium of claim 1, wherein the computer arrangement is configured to,
    receive one or more new schema, associated with the change in the one or more data values, via the distinct schema channel, and
    compute a new fingerprint for each of the one or more new schemas, wherein the one or more new schemas are stored in a cache indexed by the new fingerprint.

7. The computer-accessible medium of claim 1, wherein the computer arrangement is further configured to compress the one or more source tables prior to storing it in the at least one database.

8. The computer-accessible medium of claim 1, wherein the at least one database includes at least two databases, and wherein the computer arrangement is further configured to:
- store the one or more source tables in a first database of the at least two databases; and
- mirror the first database in a second database of the at least two databases.

9. The computer-accessible medium of claim 1, wherein the computer arrangement is further configured to:
- split the plurality of discrete transaction events, associated with a transaction stream, into a first set of events and a second set of events;
- batch process the first set of events using a first processor; and
- batch process the second set of events using a second processor.

10. The computer-accessible medium of claim 1, wherein the discrete transaction events are related to a loan application for a person.

11. The computer-accessible medium of claim 10, wherein the loan application is for an automobile loan.

12. A method for real-time capturing of data changes in a transaction stream, the method comprising:
- decomposing each transaction in a transaction stream into one or more discrete events, wherein the transaction stream is decomposed into a plurality discrete events;
- determining a fingerprint for each of the plurality of discrete events, by mapping one or more event data items into shorter bit string that uniquely identifies a corresponding event data item;
- receiving a plurality of schemas in a scheme stream transmitted via a distinct schema channel, wherein the plurality of schemas are transmitted once and stored in a cache memory;
- determining at least one schema for each of the plurality of discrete events based on a corresponding fingerprint, wherein a change in one or more data values associated with a discrete event results in a new schema;
- compressing, two or more of discrete events, corresponding to a common row, into a single discrete event, the common row being identified based on the at least one schema, wherein the at least one schema is enhanced with one or more supplemental metadata provided by a metadata registry;
- storing the plurality discrete events across a parallel arrangement of one or more source tables, based on a schema hash value associated with the at least one schema;
- scanning, in parallel, one or more source tables for one or more untokenized data elements corresponding to a sensitive information record, wherein each of the one or more source tables is associated with a distinct schema hash value one or more discrete events; and
- tokenizing the one or more untokenized data in parallel across the one or more source tables; and
- writing back the one or more tokenized data to one or more corresponding source tables in parallel.

13. The method of claim 12, wherein each of the one or more source tables include multiple insert events, update events, and delete events.

14. The method of claim 12, wherein the computer arrangement is configured to determine the at least one schema by:
- sending the at least one fingerprint to a fingerprint module; and
- receiving the at least one schema from the fingerprint module.

15. The method of claim 12, wherein the computer arrangement is further configured to identify one or more first data fields for each transaction in the transaction stream, and tokenize each of the one or more first data fields.

16. The method of claim 12, wherein the computer arrangement is further configured to compress each transaction prior to storing them in a database.

17. The method of claim 16, wherein the computer arrangement is configured to receive one or more new schema, associated with the change in the one or more data values, via the distinct schema channel, and
- compute a new fingerprint for each of the one or more new schemas, wherein the one or more new schemas are stored in a cache indexed by the new fingerprint.

18. The method of claim 12, wherein the fingerprint is attached to each discrete transaction event in the transaction stream at transmission.

* * * * *